May 4, 1937.  C. KRESS  2,079,413

VACUUM CLEANER BAG

Filed Dec. 5, 1935

INVENTOR
Charles Kress
BY
ATTORNEY

Patented May 4, 1937

2,079,413

UNITED STATES PATENT OFFICE 2,079,413

VACUUM CLEANER BAG

Charles Kress, Jamaica, N. Y., assignor to Frederick T. Kenny, Brooklyn, N. Y.

Application December 5, 1935, Serial No. 53,014

5 Claims. (Cl. 183—51)

This invention relates to new and useful improvements in a bag for vacuum cleaners.

The invention has for an object the construction of a bag as mentioned which is characterized by an outer casing of cloth material containing an inner porous filter casing arranged in a specific manner within the outer casing.

More particularly, the invention proposes constructing the outer casing to have a tubular portion at the bottom for engaging on the pipe of a blower of a vacuum cleaner, connecting a non-porous air tube with the tubular portion of the outer casing, and extending the tube along the side thereof, and arranging the inner casing with a top portion connecting with the top of the non-porous air tube. With this arrangement the drawn in air, first passes upwards through the non-porous air tube and then downwards into the porous filter in the casing.

A further object of the invention is to cover the upper portion of the porous filter casing with a non-porous shield so as to force all of the air entering the inner casing downwards. With this arrangement the outer casing may be provided with a top opening through which the inner casing may be removed when desired, and the possibility of dust escaping through the top of the outer casing is materially reduced, if not entirely eliminated.

Still further the invention proposes the provision of a plurality of shielding elements mounted along the entire length of the porous inner casing and adapted to be placed into operative or inoperative positions so that portions of the filter casing may be shielded off when desired. With this arrangement it is possible to use portions of the filter casing selectively and so insure an efficient passing of air through the filter casing since different portions may be used as required.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
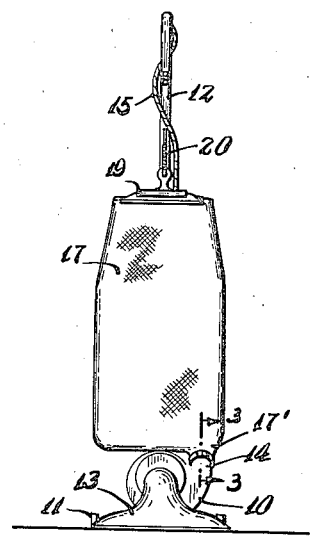
Fig. 1 is a front elevational view of a vacuum cleaner with a bag according to this invention.

On the drawing a standard vacuum cleaner is shown provided with a bag according to this invention. Briefly, the vacuum cleaner comprises a motor driven blower 10 supported on casters 11 and associated with a handle 12 by which the cleaner may be moved along. An air in-take nozzle 13, which is adapted to engage the rug or other surface to be cleaned, connects with the blower 10. The discharge from the blower is indicated by reference numeral 14. Reference numeral 15 indicates the conventional electric cord for the motor driven blower which is normally stored upon hooks 16 mounted on the handle 12.

Figure 2:
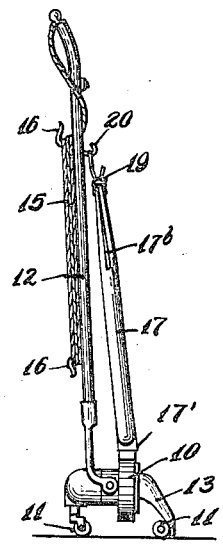
Fig. 2 is a side elevational view of Fig. 1.
Figure 4:
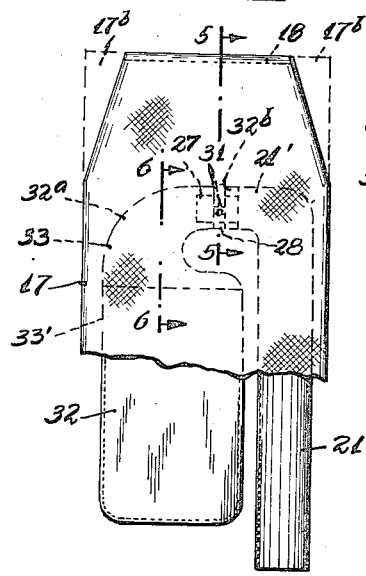
Fig. 4 is a fragmentary enlarged detailed view of the bag for the vacuum cleaner illustrated per se with a portion of the outer casing broken away.
Figure 5:
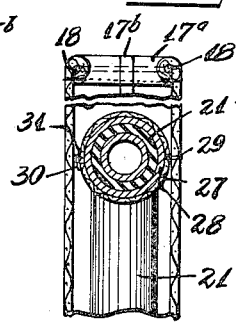
Fig. 5 is a fragmentary enlarged sectional view taken on the line 5—5 of Fig. 4.
Figure 6:
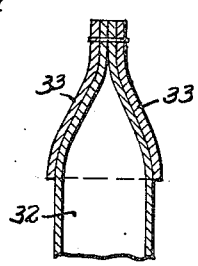
Fig. 6 is a sectional view of the inner casing per se taken on the line 6—6 of Fig. 4.

The bag for the vacuum cleaner, according to this invention, comprises an outer casing 17 of cloth material having a tubular portion 17' at the bottom for engaging upon the air outlet pipe 14 of the blower. This outer casing 17 is also formed with an open top 17ª. Reinforcement wires 18 are attached along the front and rear edges of the open top 17 and extend only a portion of the length thereof. Thus, the top corner of the bag 17, schematically indicated by the dot and dash lines 17ᵇ in Fig. 4, may be bent inwards as is customary in paper bag construction or other similar constructions. The in-turned portions 17ᵇ are clearly illustrated in Figs. 2 and 5 of the drawing. A wide clamp 19 is adapted to clamp the open top of the bag 17 with the tucked-in side portions so as to close the top of the casing and to support the casing upon a hook 20 mounted on the handle 12 for different purposes.

Figure 3:
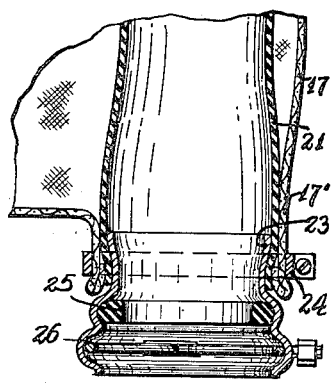
Fig. 3 is a fragmentary enlarged sectional view taken on the line 3—3 of Fig. 1.

A non-porous air tube 21, preferably of rubberized fabric, extends from the tubular portion 17' upwards along one side of the casing 17. In Fig. 3 the details of the clamp for holding the lower end of the air tube 21 are clearly illustrated. There is an annular member 23 upon which the lower end of the air tube 21 is placed. The tubular portion 17' engages over the lower end of the air tube 21. A clamping ring 24 engages over the tubular portion 17' and lower end of the air tube 21 and tightly clamps these parts on the annular member 23. This annular member is provided with a resilient gasket 25 adapted to engage against the end of the fan outlet 14 for hermetically connecting these parts. A clamping ring 26 is mounted upon the lower portion of the annular member 23 by which the annular member may be releasably detached upon the discharge tube 14 of the blower.

The tube 21 extends upwards and at the top end is formed with an elbow portion 21' which engages upon and is permanently connected with a rigid short tube 27. An outer elastic band 28 is attached by several stitches 29 to the material of the casing 17 and is adapted to encircle the tube 27. The free ends of the band 28 are provided with fastening elements, such as a hook element 30, on one of the ends engageable with an eye element 31 on the other of the ends.

A porous filter inner casing 32 is arranged within the casing 17 alongside of the tube 21 and has a top portion 32ª terminating in a tubular portion 32ᵇ engaging upon the tube 27. The band 28 engages around the tubular portion 32ᵇ so as to also attach this portion to the tube 27. The upper portion 32ª of the casing 32 has a non-porous shield 33 attached thereon. This shield extends completely from the tubular portion 32ᵇ to a point 33' at which the casing 32 is of full width. The arrangement is such that air passing through the air tube 21 will be directed around the top of the air tube and into the top portion of the filter casing 32, and finally into the main portion of the casing through which the air will pass and the dust and dirt will be retained.

Figure 7:
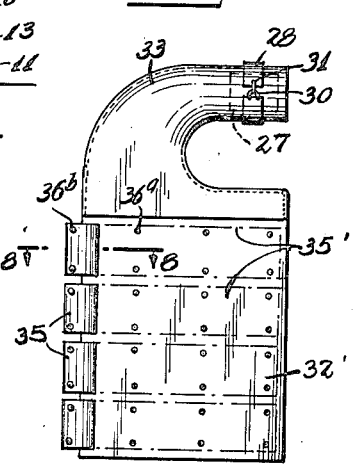
Fig. 7 is a side elevational view of a modified form of inner casing to be used in a vacuum cleaner bag according to another embodiment of the invention.
Figure 8:
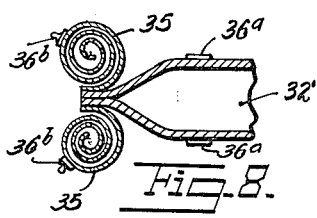
Fig. 8 is a horizontal sectional view taken on the line 8—8 of Fig. 7.

In Figs. 7 and 8 a modified form of filter casing 32' has been illustrated which is substantially identical to the prior casing, similar parts being recognizable by the same reference numerals, but distinguishes in the provision of a plurality of non-porous shields 35 attached along one side thereof and adapted to assume an inoperative position, or an operative position extended across the porous casing. These shields 35 preferably are of flexible material so that they may be rolled up into rolls as shown on the drawing which represents the inoperative positions. When thus placed within the outer casing, the outer casing engages against the rolls and holds them from unwinding.

The rolls of shields 35 may be manually unwound and extended across the porous bag 32' as indicated by the reference numerals 35'. Fastening elements are provided upon the sides of the porous bag and the shields 35 so that they may be attached in the extended or operative positions. These fastening elements comprise snap fastener elements 36ª mounted upon the porous bag 32' and cooperable with complementary snap fastener elements 36ᵇ mounted upon the shields.

When using the bag, as shown in Figs. 7 and 8, it is advisable that all of the shields, except 2, be placed into operative positions so that merely one area of the bag is being used. When this area becomes clogged with dirt and dust, the other areas may be selectively used.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A bag for a vacuum cleaner, comprising an outer casing of cloth material having a tubular portion at the bottom for engaging on the pipe of the blower of a vacuum cleaner and having an open top, means for releasably closing said top, a non-porous air tube extending from said tubular portion along one side of said casing to near the top, a porous filter within said outer casing and having a top portion with a tubular element connecting with the top of said air tube, and a non-porous shield attached on said top portion of said filter casing.

2. A bag for a vacuum cleaner, comprising an outer casing of cloth material having a tubular portion at the bottom for engaging on the pipe of the blower of a vacuum cleaner and having an open top, means for releasably closing said top, a non-porous air tube extending from said tubular portion along one side of said casing to near the top, a porous filter within said outer casing and having a top portion with a tubular element connecting with the top of said air tube, and a non-porous shield attached on said top portion of said filter casing, said non-porous shield extending from a vicinity completely across the width of the filter casing to the tubular element thereof.

3. A bag for a vacuum cleaner, comprising an outer casing of cloth material having a tubular portion at the bottom for engaging on the pipe of the blower of a vacuum cleaner and having an open top, means for releasably closing said top, a non-porous air tube extending from said tubular portion along one side of said casing to near the top, a porous filter within said outer casing and having a top portion with a tubular element connecting with the top of said air tube, and a non-porous shield attached on said top portion of said filter casing, and a plurality of non-porous shields mounted along the length of the filter casing and adapted to be placed into operative and inoperative positions.

4. A bag for a vacuum cleaner, comprising an outer casing of cloth material having a tubular portion at the bottom for engaging on the pipe of the blower of a vacuum cleaner and having an open top, means for releasably closing said top, a non-porous air tube extending from said tubular portion along one side of said casing to near the top, a porous filter within said outer casing and having a top portion with a tubular element connecting with the top of said air tube, and a non-porous shield attached on said top portion of said filter casing, and a plurality of non-porous shields mounted along the length of the filter casing and adapted to be placed into operative and inoperative positions, fastening elements being mounted upon the filter casing and engageable with complementary fastening elements upon the shields by which the shields may be held in the operative position.

5. A bag for a vacuum cleaner, comprising an outer casing of cloth material having a tubular portion at the bottom for engaging on the pipe of the blower of a vacuum cleaner and having an open, top means for releasably closing said top, a non-porous air tube extending from said tubular portion along one side of said casing to near the top, a porous filter within said outer casing and having a top portion with a tubular element connecting with the top of said air tube, and a non-porous shield attached on said top portion of said filter casing, and a plurality of non-porous shields mounted along the length of the filter casing and adapted to be placed into operative and inoperative positions, said shields being made of flexible material so that they may be rolled up in rolls and so engage against the inside area of said outer casing and thus hold said shields in an inoperative position.

CHARLES KRESS.